(12) United States Patent
Noh et al.

(10) Patent No.: US 8,295,156 B2
(45) Date of Patent: Oct. 23, 2012

(54) TRANSMITTER FOR EXTENDING GUARD INTERVAL FOR INDIVIDUAL USER EQUIPMENT IN OFDMA SYSTEMS

(75) Inventors: Taegyun Noh, Daejon (KR); Minjoong Rim, Seoul (KR); Byung-Jang Jeong, Daejon (KR); Hyojin Lee, Daejon (KR); Hyun Kyu Chung, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 111 days.

(21) Appl. No.: 12/514,409

(22) PCT Filed: Oct. 30, 2007

(86) PCT No.: PCT/KR2007/005364
§ 371 (c)(1),
(2), (4) Date: Nov. 11, 2009

(87) PCT Pub. No.: WO2008/056901
PCT Pub. Date: May 15, 2008

(65) Prior Publication Data
US 2010/0061224 A1    Mar. 11, 2010

(30) Foreign Application Priority Data

Nov. 10, 2006 (KR) .......... 10-2006-0111214
Oct. 11, 2007 (KR) .......... 10-2007-0102609

(51) Int. Cl.
*H04J 11/00* (2006.01)
(52) U.S. Cl. ...................... 370/210; 370/208
(58) Field of Classification Search ........ 370/206, 370/208, 210, 260; 455/426; 375/355, 260
See application file for complete search history.

(56) References Cited

U.S. PATENT DOCUMENTS

| 6,618,452 | B1 * | 9/2003 | Huber et al. ............ 375/343 |
| 7,072,411 | B1 | 7/2006 | Dollard |
| 2002/0118765 | A1 | 8/2002 | Nangia et al. |
| 2003/0016773 | A1 | 1/2003 | Atungsiri et al. |
| 2006/0085497 | A1 * | 4/2006 | Sehitoglu ............ 708/405 |

(Continued)

OTHER PUBLICATIONS

Ofuji, Yoshiaki et al., "Frequency Domain Channel-Dependent Scheduling Employing an Adaptive Transmission Bandwidth for Pilot Channel in Uplink Single-Carrier-FDMA Radio Access," *IEEE 63rd Vehicular Technology Conference*, vol. 1 :334-338 (2006).

(Continued)

*Primary Examiner* — David Oveissi
(74) *Attorney, Agent, or Firm* — Nelson Mullins Riley & Scarborough LLP; EuiHoon Lee, Esq.

(57) ABSTRACT

Provided is a technology for extending a guard interval for individual user equipment in an OFDMA system. The transmitting apparatus includes: a guard interval extension processor for generating symbols with a guard interval extended by copying a part of a current symbol and pasting the copied part to a last part of a previous symbol; a Fourier Transform (FT) processor for receiving the processed symbols from the guard interval extension processor and performing an FT process on the received processed symbols; an Inverse Fast Fourier Transform (IFFT) processor for performing an IFFT process on the FT processed symbols from the FT processor; a mapping processor for mapping outputs of the FT processor to input points of the IFFT processor to load the FT processed frequency-domain data on corresponding sub-carriers; and a cyclic prefix inserter for inserting a cyclic prefix code to output of the IFFT processor.

9 Claims, 2 Drawing Sheets

U.S. PATENT DOCUMENTS

2007/0092025 A1* 4/2007 Bi et al. .................. 375/284

OTHER PUBLICATIONS

International Search Report for Application No. PCT/KR2007/005364, dated Feb. 5, 2008.

Written Opinion for Application No. PCT/KR2007/005364, dated Feb. 5, 2008.

Rim, Minjoong et al., "Guard Interval Extension for Individual Users in Uplink OFDMA Mobile Communication Systesms," Korea Information and Communications Society, vol. 32(5):417-425 (2007).

* cited by examiner

TRANSMITTER FOR EXTENDING GUARD INTERVAL FOR INDIVIDUAL USER EQUIPMENT IN OFDMA SYSTEMS

RELATED APPLICATIONS

This application is a 35 U.S.C. §371 national stage filing of PCT Application No. PCT/KR2007/005364 filed on Oct. 30, 2007, which claims priority to, and the benefit of, Korean Patent Application No. 10-2006-0111214 filed on Nov. 10, 2006 and Korean Patent Application No. 10-2007-0102609 filed on Oct. 11, 2007. The contents of the aforementioned applications are hereby incorporated by reference.

TECHNICAL FIELD

The present invention relates to a technology for extending a guard interval for individual user equipment in an Orthogonal Frequency Division Multiple Access (OFDMA) system; and, more particularly, to a transmitting apparatus and method for guaranteeing a predetermined terminal to have a proper level of a performance and not affecting the performance of other terminals by extending only the guard interval of a predetermined terminal having delay extension exceeding a cyclic prefix (CP) interval in an OFDMA system.

This work was supported by the IT R&D program of MIC/IITA [2006-S-001-01, "Development of Adaptive Radio Access and Transmission Technologies for $4^{th}$ Generation Mobile Communications"].

BACKGROUND ART

Lately, many researchers are studying about an Orthogonal Frequency Division Multiple Access (OFDMA) scheme and a Single Carrier Frequency Division Multiple Access (SC-FDMA) scheme in progress to develop a method for transmitting data through a radio channel at a high speed.

OFDMA is a scheme for transmitting data using multicarrier. That is, OFDMA receives a serial symbol sequence and modulators the received serial symbol sequence to a plurality of sub-carriers having orthogonality by converting the serial symbol sequence to parallel data.

Figure 1:
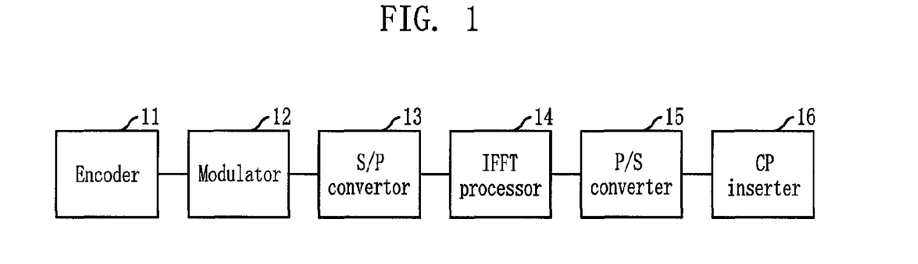
FIG. 1 is a block diagram illustrating a transmitter of an OFDMA system in accordance with the related art.

FIG. 1 is a block diagram illustrating a transmitter of an OFDMA system in accordance with the related art.

Referring to FIG. 1, the OFDMA transmitter includes an encoder 11, a modulator 12, a serial to parallel (S/P) converter 13, an N sized inverse fast fourier transform (IFFT) processor 14, a parallel to serial (P/S) converter 15, and a cyclic prefix (CP) inserter 16.

The encoder 11 performs a channel encoding process. That is, the encoder 11 receives sequences of information bits and performs the channel encoding process on the received sequences. In general, a convolutional encoder, a turbo encoder, or a Low Density Parity Check (LDPC) encoder is used as the encoder 11.

The modulator 12 performs a modulation process based on a quadrature phase shift keying scheme (QPSK), 8 PSK, 16-ary quadrature amplitude modulation (16 QAM), 64 QAM, or 256 QAM.

The S/P converter 13 receives the modulated data from the modulator 12 and converts the received data to parallel data. The IFFT processor 14 receives the parallel data from the S/P converter 13 and performs the IFFT process on the received parallel data. The P/S converter 15 converts the output from the IFFT processor 14 to serial data. The CP inserter 16 inserts a cyclic prefix to the output data of the P/S converter 15.

As described above, the CP interval must be greater than a delay extension interval in the OFDMA system. However, it is not simple to decide a proper CP interval in consideration of various environmental factors in a wireless communication system. In the wireless communication environment, the delay extension usually has a small value. However, the delay extension may rarely have a great value if a terminal is located at a cell boundary, if a terminal is surrounded by mountains, or if delay is added by repeaters. The delay extension is not a unique variable of a cell. The delay extension may have different value according to the location of a terminal.

Since the delay extension has a small value in an urban area where needs a wideband communication system, a guard interval must have a small value in order to maximize the performance of a system. Here, a terminal having a great delay extension requires to process interference between symbols, which is generated when the delay extension exceeds the CP interval.

In a downlink of the OFDMA system, only a delay extension is considered for a CP interval. However, a guard interval must be also considered based on a timing error of an uplink signal as well as the delay extension. Particularly, a timing error may be great when an initial access process is performed in a large cell, when a handover process is performed in a large cell, or when a terminal does not exchange data with a base station for a long time. The timing error requires a very large guard interval because the timing error is added with the delay extension.

If the guard interval is not large enough, the performance of a system generally deteriorates due to interference between symbols. If the power is not controlled properly, the interference of a terminal can influence the performances of the other terminals. Radio resources may be seriously wasted if a CP interval is decided based on both of the maximum delay extension and the maximum timing error. Therefore, there is a demand for developing a method for individually maximizing a guard interval for a user terminal that generates a long timing error or long delay extension for sustaining a small CP interval for an uplink.

DISCLOSURE

Technical Problem

An embodiment of the present invention is directed to providing a transmitting apparatus and method for guaranteeing a predetermined terminal to have a proper level of a performance and not influencing the performance of other terminals by extending only the guard interval of a predetermined terminal having delay extension exceeding a cyclic prefix (CP) interval in an OFDMA system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a transmitting apparatus for extending a guard interval of data transmitted to terminals which are predicted to have delay extension or a timing error greater than a guard interval in an Orthogonal Frequency Division Multiple Access (OFDMA) system. The transmitting apparatus includes: a guard interval extension processor for generating symbols with a guard interval extended by copying a part of a current symbol and pasting the copied part to a last part of a previous symbol; a Fourier Transform (FT) processor for receiving the processed symbols from the guard interval extension processor and performs an FT process on the received processed symbols; an Inverse Fast Fourier Transform (IFFT) processor for performing an IFFT process on the FT processed symbols from the FT processor; a mapping processor for mapping outputs of the FT processor to input points of the IFFT processor to load the FT processed frequency-domain data on corresponding sub-carriers; and a cyclic prefix inserter for inserting a cyclic prefix code to output of the IFFT processor.

In accordance with another aspect of the present invention, there is provided a transmitting apparatus for extending a guard interval of data transmitted to terminals which are predicted to have delay extension or a timing error greater than a guard interval in an OFDMA system. The transmitting apparatus includes: a guard interval extension processor for generating symbols with a guard interval extended by copying a part of a current symbol and pasting it to a last part of a previous symbol; an up-sampling processor for receiving the processed symbols from the guard interval extension processor and performing an up-sampling process; an interpolation processor for performing circular convolution based on an interpolation filter value to load frequency-domain data on corresponding sub-carriers for the outputs of the up-sampling processor; and a cyclic prefix inserter for inserting a cyclic prefix code to output of the IFFT processor.

In accordance with another aspect of the present invention, there is provided a transmitting method for extending a guard interval of data transmitted to terminals which are predicted to have delay extension or a timing error greater than a guard interval for an OFDMA system. The transmitting method includes the steps of: a) generating symbols with a guard interval extended by copying a part of a current symbol and pasting it to a previous symbol; b) spreading the symbols with the guard interval spread through Fourier transform; c) performing an IFFT process to allocate sub-carriers for the FT processed frequency-domain data based on a localized allocation method; and d) inserting a cyclic prefix code to the IFFT processed data.

In accordance with another aspect of the present invention, there is provided a transmitting method for extending a guard interval of data transmitted to terminals which are predicted to have delay extension or a timing error greater than a guard interval for an OFDMA system. The transmitting method includes the steps of: a) generating symbols with a guard interval extended by copying a part of a current symbol and pasting it to a previous symbol; b) performing an up-sampling process on the symbols with the extended guard interval; c) interpolating the up-sampled symbols by performing circular convolution based on an interpolation filter value to allocate sub-carriers to the up-sampled frequency-domain data; and d) inserting a cyclic prefix code to the interpolated data.

Advantageous Effects

A transmitting apparatus and method according to an embodiment of the present invention can improve the performances of the other terminals as well as the performance of a predetermined terminal by individually extending a guard interval of the predetermined terminal when the predetermined terminal is predicted to have a great timing error or a great delay extension for an uplink in an OFDMA system.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

A symbol $\tilde{x}$ denotes an OFDMA symbol after N size of Inverse Fast Fourier Transform (IFFT) is performed. A symbol $\tilde{x}$ having a length of N+K where K is a length of a cyclic prefix (CP) interval can be expressed as Eq. 1.

$$\tilde{x}(i) = \begin{cases} x(i+N) & (i < 0) \\ x(i) & (i \geq 0) \end{cases} \qquad \text{Eq. 1}$$

$$(-K \leq i \leq N-1)$$

In Eq. 1, a size of delay extension is smaller than a cyclic prefix (CP) interval, no interference between symbols exists. However, it is necessary to extend a guard interval to avoid interference between symbols when a predetermined terminal has great delay extension or a great timing error. In other words, it is necessary to individually extend a guard interface for a terminal having great delay extension or a great timing error if most terminals sustain small delay extension and small timing error and a predetermined terminal has great delay extension and a great timing error.

When delay extension has a value of K+M greater than a CP interval K, interference between symbols is generated because a previously OFDMA symbol $\tilde{x}_{previous}$ influences a current OFDMA symbol $\tilde{x}$. In order to prevent the interference between symbols from being generated, extension interval for the last M samples of a previous OFDMA symbol $\tilde{x}_{previous}$. The previous OFDMA symbol can be expressed as Eq. 2.

$$x_{previous}(i) = x(i-K)(N-M \leq i < N) \qquad \text{Eq. 2}$$

Since the first OFDMA symbol does not have a previous OFDMA symbol, the first OFDMA symbol can be expressed as Eq. 3 (zero padding).

$$x_{first}(i) = 0 (N-K-M \leq i < N-K) \qquad \text{Eq. 3}$$

The last OFDMA symbol can be also expressed as Eq. 4 (zero padding) not to influence following other terminals $$x_{last}(i)=0 (N-M \leq i < N) \qquad \text{Eq. 4}$$

In the present embodiment, a guard interval is not extended by a CP code is not inserted in an OFDMA symbol after an IFFT process is performed to extend a guard interval of a predetermined terminal. That is, a guard interval of a predetermined terminal is individually extended in a procedure of generating transmission data before a DFT process in an OFDMA system in the present embodiment. In order to extend the guard interval, a SC-FDMA technology is used. In case of block hopping, an OFDMA scheme and a SC-FDMA scheme can be used together. That is, one of the OFDMA scheme and a SC-FDMA scheme can be selectively used according to the state of each block. If a timing error of a terminal is great, a SC-FDMA scheme is used.

Figure 2:
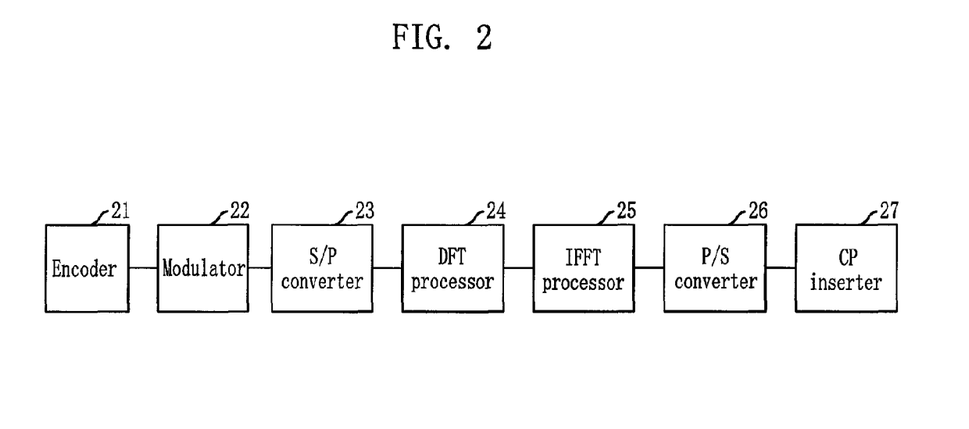
FIG. 2 is a block diagram illustrating a transmitter of an SC-FDMA system in accordance with the related art.

FIG. 2 is a block diagram illustrating a transmitter of a SC-FDMA system in accordance with the related art.

Referring to FIG. 2, the transmitter for the SC-FDMA system includes an encoder 21, a modulator 22, an S/P converter 23, a discrete fourier transform (DFT) processor 24, an IFFT processor 25, a P/S converter 26, and a CP inserter 27.

The encoder 21 receives predetermined sequences of information bits and performs a channel encoding process thereon. The modulator 22 modulates the encoded data based on one of QPSK, 8 PSK, 16 QAM, 64 QAM, and 256 QAM schemes. The S/P converter 23 receives the modulated data from the modulator 22 and converts the modulated data to parallel data. The DFT processor 24 receives the parallel data from the S/P converter 23 and performs the DFT process thereon. The IFFT processor 25 receives the transformed data from the DFT processor 24 and performs the IFFT process thereon. Here, a mapping processor (not shown) may be disposed between the DFT processor 24 and the IFFT processor 25.

The mapping processor maps the output data of the DFT processor to the input data of the IFFT processor. That is, the mapping processor maps the output data of the DFT processor to corresponding input points of the IFFT processor to load the frequency-domain transformed data from the DFT processor on sub-carriers. Here, the output symbols from the DFT processor are sequentially mapped to the input points of the IFFT processor in order to use continuous sub-carriers on a frequency domain. Such a mapping method is referred as a localized allocation. Also, the output symbols from the DFT processor may be mapped to the input points of the IFFT processor at a predetermined interval in order to use sub-carriers separated at the same interval on a frequency domain. Such a mapping method is referred as a distribution allocation.

The P/S converter 26 converts the output data of the IFFT processor 25 to serial data. The CP inserter 27 inserts a cyclic prefix (CP) in the output data of the P/S converter 26.

Meanwhile, a DFT function and an IDFT function may be replaced with a FFT function and an IFFT function. N may be an integer such as 1, 2, 3, and 4 for the DFT Function and the IDFT function. Also, N may be a square value of 2, such as 1, 2, 4, 8, and 16 for the FFT function and the IFFT Function.

Hereinafter, a method for extending a guard interval for an individual terminal will be described with reference to FIGS. 3 to 6.

In general, a terminal performs a random access process when the terminal initially accesses a base station of a predetermined cell or when the terminal performs a handover process, or when the terminal needs to transmit data after the terminal did not transmit data for long time. After performing the random access process, a base station receives necessary information from a terminal through an allocated radio resource. Here, the base station can be aware of the location of a terminal in a cell based on the received information. The location information denotes a distance from a base station to a terminal. A base station may predict terminals having great delay extension or great timing error based on the information about the distance from the base station to the terminal.

Based on the prediction, the base station transmits data to the terminals predicted to have great delay extension or great timing error after extending a guard interval thereof.

Figure 3:
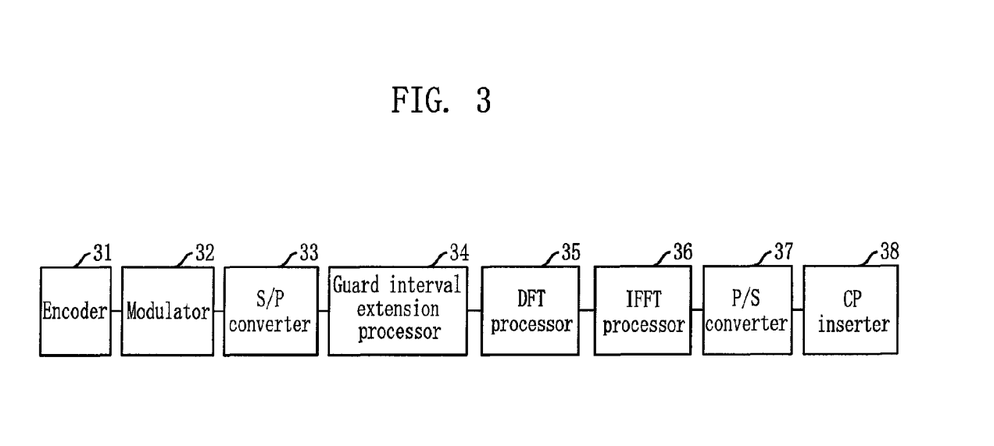
FIG. 3 is a block diagram illustrating a transmitter in accordance with an embodiment of the present invention.

FIG. 3 is a block diagram illustrating a transmitter in accordance with an embodiment of the present invention. In the present embodiment, the transmitter uses a SC-FDMA scheme.

The transmitter according to the present embodiment includes an encoder 31, a modulator 32, a serial to parallel converter 33, a guard interval extension processor 34, a discrete Fourier transform processor 35, an N sized IFFT processor 36, a parallel to serial converter 37, and a cyclic prefix inserter 38.

The encoder 31 receives a bit sequence of data to be transmitted and performs a channel-encoding process thereon. The modulator 32 modulates the encoded data from the encoder according to one of QPSK, 8 PSK, 16 QAM, 64 QAM, and 256 QAM schemes. The S/P converter 33 receives the modulated data from the modulator 32 and converts the modulated data to parallel data.

The guard interval extension processor 34 generates a symbol with an extended guard interval by copying a part of a current symbol and pasting the copied part to the last part of a previous symbol for M sample symbols where M is an integer number in order to extend a guard interval for data transmitted to terminals which are predicted to have great delay extension or a great timing error based on information about a distance from a base station to a terminal.

Figure 6:
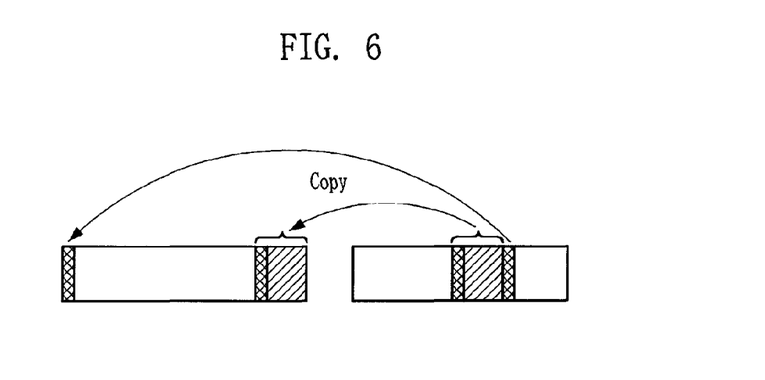
FIG. 6 is a diagram illustrating copying data at a previous symbol for additionally extending a guard interval in accordance with an embodiment of the present invention.

Here, the guard interval extension processor 34 may additionally copy a of a symbol adjacent to the copied data as shown in FIG. 6 in order to reduce interpolation difference between the copied data and original transmission data. In other words, IFFT processed intermediate values cannot satisfy Eq. 2 when a symbol with an extended guard interval is generated by copying a part of a current symbol and pasting the copied part to the last part of a previous symbol. In order to overcome such a problem, it is required to copy data adjacent to a predetermined part of the copied symbol to the previous symbol as well as a target symbol. After the guard interval extension processor 34 extends the guard interval by additionally copying adjacent data, the IFFT processed symbols become more similar to each others. However, the amount of data to be transmitted is reduced as much as the additionally extended guard interval. Therefore, it is required to carefully decide a value of additionally extending a guard interval.

The DFT processor 35 receives the output symbols of the guard interval extension processor 34 and spreads the received symbols through Discrete Fourier Transform.

A mapping processor (not shown) may be disposed between the DFT processor 35 and the IFFT processor 36. The mapping processor maps the transformed frequency-domain data from the DFT processor 35 to input points of the IFFT processor 36 in order to load the transformed frequency-domain data on corresponding sub-carriers. In the present embodiment, the mapping processor uses a localized allocation method that sequentially maps the output symbols of the DFT processor 35 to the input points of the IFFT processor 36.

If the localized allocation method is used to allocate the DFT processed frequency-domain data to continuous sub-carriers, a symbol allocated at a predetermined P location may be expressed as shown Eq. 5.

$$X(k) = \begin{cases} S(k-P) & P - L/2 \le k < P + L/2 \\ 0 & \text{othewise} \end{cases} \quad \text{Eq. 5}$$

Also, the mapping processor allocates a sub-carrier using a window. In other words, the amount of data to be transmitted is reduced as much as the additional extension if the guard interval extension processor 34 additionally extends a guard interval. In order to make the IFFT processed symbols identical while sustaining an additionally extended guard interval small, a tail part of a sub-carrier is reduced in the present embodiment. If a rectangular sub-carrier is allocated at a frequency domain, a signal may have sinc function. However, if a sub-carrier is allocated using a raised-cosine window, a tail part of a signal is significantly reduced.

The IFFT processed symbols become identical because it is less influenced by adjacent values. Also, if a window is applied, the peak-to-average power ratio (PAPR) can be reduced too. However, more sub-carriers will be used if the window is applied. Therefore, the resources may be wasted.

The IFFT processor 36 performs an IFFT process on the mapped data from the mapping processor based on the localized allocation method. The P/S converter 37 converts the output data of the IFFT processor 36 to serial data. The CP inserter 38 inserts a CP code into the output data of the P/S converter 57.

As described above, the DFT function and the IDFT function may be replaced with a FFT function and an IFFT function.

Figure 4:
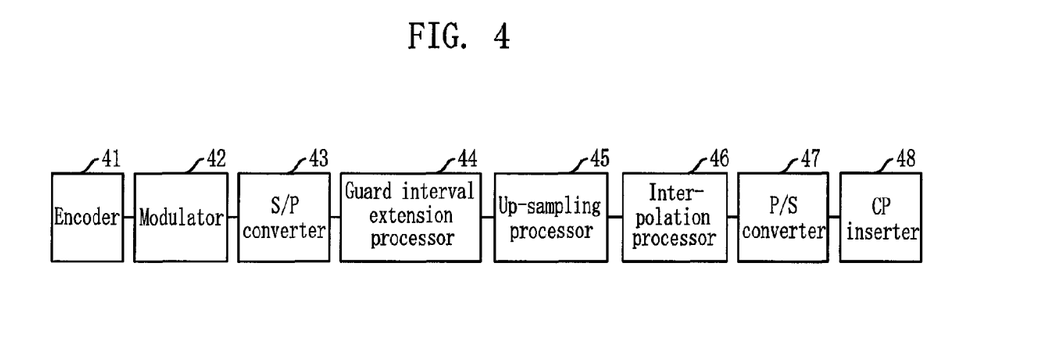
FIG. 4 is a block diagram illustrating a transmitter in accordance with another embodiment of the present invention.
Figure 5:
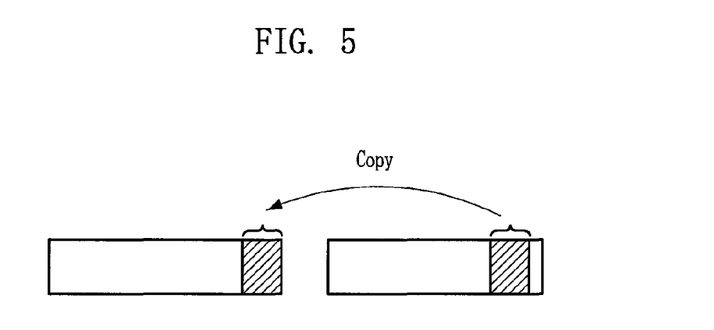
FIG. 5 is a diagram illustrating copying data at a previous symbol for extending a guard interval in accordance with an embodiment of the present invention.

FIG. 4 is a block diagram illustrating a transmitter in accordance with another embodiment of the present invention.

The transmitter according to the present embodiment includes an encoder 41, a modulator 42, an S/P converter 43, a guard interval extension processor 44, an up-sampling processor 45, an interpolation processor 46, a P/S converter 47, a cyclic prefix (CP) inserter 48.

The encoder 41 receives a bit sequence of transmission data and performs a channel coding process. The modulator 42 modulates the channel-encoded data based on one of QPSK, 8 PSK, 16 QAM, 64 QAM, and 256 QAM schemes. The S/P converter 43 receives the modulated data from the modulator 42 and converts the modulated data to parallel data.

As described above with reference to FIG. 3, the guard interval extension processor 44 generates a symbol with an extended guard interval by extending a guard interval for data transmitted from terminals that are predicted to have great delay extension or great timing error based on information about a distance between a base station and terminals. In other words, the guard interval extension processor 44 generates a symbol with an extended guard interval by copying a part of a current symbol and pasting the copied part to the last part of a previous symbol for M sample symbols where M is a natural number. Also, the guard interval extension processor 44 additionally copies data of symbols adjacent to the copied symbol to a previous symbol in order to reduce interpolation difference between the copied data and the original transmission data.

The up-sampling processor 45 receives the output symbols from the guard interval extension processor 44 and performs an up sampling process thereon.

The interpolation processor 46 interpolates the up-sampled symbols from the up-sampling processor 45. The interpolation processor 46 uses a window to allocate sub-carriers. In other words, if the guard interval extension processor 44 extends a guard interval additionally, the amount of data to be transmitted is reduced as much as the extension. Therefore, a tail part of a sub-carrier is reduced in order to make interpolated symbols identical while sustaining an additionally extended guard interval small. If a rectangular sub-carrier is allocated at a frequency domain, a sub-carrier has a sinc function. However, if a raised-cosine window is used at a frequency domain to allocate sub-carriers, a tail part of a signal can be significantly reduced.

If the tail part of a signal is reduced by applying such a window, it is possible to make the interpolated symbols identical while sustaining an extended guard interval small because the interpolated symbols are less influenced to each others. Also, if a window is applied, the peak-to-average power ratio (PAPR) can be reduced too. However, more sub-carriers will be used if the window is applied. Therefore, the resources may be wasted. The up-sampling processor 45 and the interpolation processor 46 will be described in later.

The P/S converter 47 converts the output data of the interpolation processor 46 to serial data. The CP inserter 48 inserts a cyclic prefix (CP) code to the output data of the P/S converter 47.

Hereafter, the detail operations of the up-sampling processor 45 and the interpolation processor 46 will be described.

A procedure of interpolating a time-domain signal S to an interpolated output signal x in a localized allocation based SC-FDMA system will be described. At first, the up-sampling processor 45 up-samples the time-domain signal S. Then, the interpolation process 46 performs circular convolution on the up-sampled signal and an interpolation filter value.

If N/L is an integer with conditions of $0 \le n < N$ and $0 \le l < L$, the time-domain signal S is up-sampled as shown in Eq. 6.

$$\tilde{s}(n) = \begin{cases} s(l) & n = lN/L \\ 0 & \text{otherwise} \end{cases} \quad \text{Eq. 6}$$

If N/L is an integer with condition of $-N/2 \le n < N/2$, the interpolation filter value g(n) is defined like Eq. 7.

$$g(n) \equiv \frac{1}{l} \sum_{m=-L/2}^{L/2-1} e^{j2\pi(m+P)n/N} \quad \text{Eq. 7}$$

$$= \frac{1}{L} \frac{\sin(\pi n L/N)}{\sin(\pi n/N)} e^{j\pi n(L-1+2P)/N}$$

The interpolation processor 46 interpolates a signal and outputs the interpolated signal x. The interpolated signal x can be expressed as Eq. 8.

$$x(n) = \sum_{k=0}^{N-1} X(k) e^{j2\pi nk/N} \quad \text{Eq. 8}$$

$$= \sum_{m=-L/2}^{L/2-1} S(m) e^{j2\pi n(P+m)/N}$$

-continued $$= \sum_{m=-L/2}^{L/2-1} \left(\frac{1}{L}\sum_{l=0}^{L-1} s(l)e^{-j2\pi lm/L}\right)e^{j2\pi n(m+P)/N}$$

$$= \sum_{l=0}^{L-1} s(l)e^{j2\pi lP/L} \frac{1}{L} \sum_{m=-L/2}^{L/2-1} e^{j2\pi(m+P)(n-lN/L)/N}$$

$$= \sum_{l=0}^{L-1} s(l)e^{j2\pi lP/L} g(n - lN/L)$$

$$= \sum_{k=0}^{N-1} \tilde{s}(k)e^{j2\pi kP/N} g(n-k)$$

$$= \tilde{s}(n)e^{j2\pi nP/N} * g(n)$$

Since the interpolation filter value of Eq. 7 satisfies the same characteristics of Eq. 9, the interpolation filter value can be defined as Eq. 10. The other values have a value interpolated by the interpolation processor.

$$g(0) = 1 \qquad \text{Eq. 9}$$
$$g(lN/L) = 0 \quad (0 < l < L)$$

$$x(lN/L) = \tilde{s}(lN/L)e^{j2\pi lP/L} \qquad \text{Eq. 10}$$
$$= s(l)e^{j2\pi lP/L}$$

A previous time-domain signal $s_{previous}$ for guard interval extension can be expressed as Eq. 11.

$$s_{previous}(l) = s(l-KL/N)e^{-j2\pi PK/N} \ (L-ML/N \leq l < L) \qquad \text{Eq. 11}$$

The up-sampled data $\tilde{s}_{previous}$ of the previous time-domain signal $s_{previous}$ can be expressed as Eq. 12.

$$\tilde{s}_{previous}(n) = \tilde{s}(n-K)e^{-j2\pi PK/N} \ (N-M \leq n < N) \qquad \text{Eq. 12}$$

The interpolation processor 46 interpolates the up sampled signal. The interpolated signal can be expressed as Eq. 13.

$$x_{previous}(n)|_{n=lN/L} = \tilde{s}_{previous}(n)e^{j2\pi nP/N} * g(n)|_{n=lN/L} \qquad \text{Eq. 13}$$
$$= \tilde{s}(n-K)e^{-j2\pi PK/N} e^{j2\pi nP/N} * g(n)|_{n=lN/L}$$
$$= \tilde{s}(n-K)e^{j2\pi P(n-K)/N} * g(n)|_{n=lN/L}$$
$$= x(n-K)|_{n=lN/L}$$

$$(N - M \leq n < N)$$

However, the interpolated intermediate values of Eq. 13 cannot satisfy Eq. 2. In order to satisfy Eq. 2, it is required to copy data adjacent to the copied data to a previous symbol as well as the target data to copy for extending a guard interval. A previous time-domain signal $s_{previous}$ can be defined as Eq. 14. In Eq. 14, M denotes a signal with an extended guard interval and α denotes an additionally extended interval.

$$s_{previous}(l) = \begin{cases} s(l-KL/N)e^{-j2\pi PK/N} \\ (L-ML/N-\alpha/2 \leq l < L) \\ s(l+L-KL/N)e^{-j2\pi PK/N} \\ (0 \leq l \leq \alpha/2) \end{cases} \qquad \text{Eq. 14}$$

When a guard interval additionally increases, the interpolated values become more identical. However, the amount of data to be transmitted is reduced. Therefore, it is required to carefully decide a value of additionally extending a guard interval. However, it is possible to make interpolated values identical while sustaining an additional extension value small by reducing a tail part of a sub-carrier. If a rectangular sub-carrier is allocated at a frequency domain, an interpolation filter obtains the sinc function of Eq. 7. However, if a raised-cosine window is used at a frequency domain to allocate sub-carriers, the tail part of an interpolation filter is reduced. Sub-carrier allocation can be expressed as Eq. 15. In Eq. 15, β(k) denotes a window of a frequency domain.

$$X(k) = \beta(k)S(\text{mod}(k-P, L)) \qquad \text{Eq. 15}$$

An interpolation filter value $\tilde{g}(n)$ can be expressed as Eq. 16 when a window is used under condition of $0 \leq n < N$.

$$\tilde{g}(n) \equiv \frac{1}{L}\sum_{k=0}^{N-1} \beta(k)e^{j2\pi kn/N} \qquad \text{Eq. 16}$$

The interpolated data x from the interpolation processor 46 can be expressed as Eq. 17.

$$x(n) = \sum_{k=0}^{N-1} X(k)e^{j2\pi nk/N} \qquad \text{Eq. 17}$$

$$= \sum_{k=0}^{N-1} \beta(k)S(\text{mod}(k-P, L))e^{j2\pi nk/N}$$

$$= \sum_{k=0}^{N-1} \beta(k)\left(\frac{1}{L}\sum_{l=0}^{L-1} s(l)e^{-j2\pi l(k-P)/L}\right)e^{j2\pi nk/N}$$

$$= \sum_{l=0}^{L-1} s(l)e^{j2\pi lP/L} \frac{1}{L}\sum_{k=0}^{N-1} \beta(k)e^{j2\pi k(n-lN/L)/N}$$

$$= \sum_{l=0}^{L-1} s(l)e^{j2\pi lP/L} \tilde{g}(n - lN/L)$$

$$= \sum_{k=0}^{N-1} \tilde{s}(k)e^{j2\pi kP/N} \tilde{g}(n-k)$$

$$= \tilde{s}(n)e^{j2\pi nP/N} * \tilde{g}(n)$$

If the window is applied, the size of the tail part of the interpolation filter is reduced and the interpolated value becomes identical while sustaining an additional extension value α small because the interpolated value is hardly influenced by adjacent values.

As described above, the technology of the present invention can be realized as a program. The codes and code segments constituting the program may be easily inferred by a computer programmer of the present invention to which the present invention pertains. The program may be stored in a computer-readable recording medium, i.e., a data storage, and read and executed by a computer to implement the method of the present invention. The recording medium includes all types of data storing media whose data can be read by a computer.

While the present invention has been described with respect to certain preferred embodiments, it will be apparent to those skilled in the art that various changes and modifications may be made without departing from the scope of the invention as defined in the following claims.

What is claimed is:

1. A transmitting apparatus for extending a guard interval of data transmitted to terminals which are predicted to have delay extension or a timing error greater than a guard interval in an Orthogonal Frequency Division Multiple Access (OFDMA) system, comprising:
 a guard interval extension processing means for generating symbols with a guard interval extended by copying a part of a current symbol and pasting the copied part to a last part of a previous symbol;
 a Fourier Transform (FT) processing means for receiving the processed symbols from the guard interval extension processing means and performing an FT process on the received processed symbols;
 an Inverse Fast Fourier Transform (IFFT) processing means for performing an IFFT process on the FT processed symbols from the FT processing means;
 a mapping processing means for mapping outputs of the FT processing means to input points of the IFFT processing means to load the FT processed frequency-domain data on corresponding sub-carriers; and
 a cyclic prefix insertion means for inserting a cyclic prefix code to output of the IFFT processing means,
 wherein the guard interval extension processing means additionally copies a part of data adjacent to the copied data for extending a guard interval and pastes the part of adjacent data to a previous symbol in order to reduce difference between the copied data and original data that are transmitted,
 wherein the mapping processing means allocates sub-carriers using a window to reduce tail part of a sub-carrier.

2. The transmitting apparatus of claim 1, wherein the mapping processing means sequentially maps the outputs of the FT processing means to input points of the IFFT processing means to allocate sub-carriers based on a localized allocation method.

3. The transmitting apparatus of claim 1, wherein the FT processing means performs a Discrete Fourier Transform (DFT) process.

4. The transmitting apparatus of claim 1, wherein the FT processing means performs a Fast Fourier Transform (FFT) process.

5. A transmitting apparatus for extending a guard interval of data transmitted to terminals which are predicted to have delay extension or a timing error greater than a guard interval in an OFDMA system, comprising:
 a guard interval extension processing means for generating symbols with a guard interval extended by copying a part of a current symbol and pasting the coped part to a last part of a previous symbol;
 an up-sampling processing means for receiving the processed symbols from the guard interval extension processing means and performing an up-sampling process;
 an interpolation processing means for performing circular convolution based on an interpolation filter value to load frequency-domain data on corresponding sub-carriers for the outputs of the up-sampling processing means; and
 a cyclic prefix insertion means for inserting a cyclic prefix code to output of the IFFT processing means,
 wherein the guard interval extension processing means additionally copies a part of data adjacent to the copied data for extending a guard interval and pastes the part of adjacent data to a previous symbol to reduce interpolation difference between the copied data and original data that are transmitted,
 wherein the interpolation processing means uses a window to allocate sub-carriers to reduce tail part of sub-carriers.

6. A transmitting apparatus for extending a guard interval of data transmitted to terminals which are predicted to have delay extension or a timing error greater than a guard interval in an OFDMA system, comprising:
 a guard interval extension processing means for generating symbols with a guard interval extended by copying a part of a current symbol and pasting the coped part to a last part of a previous symbol;
 an up-sampling processing means for receiving the processed symbols from the guard interval extension processing means and performing an up-sampling process;
 an interpolation processing means for performing circular convolution based on an interpolation filter value to load frequency-domain data on corresponding sub-carriers for the outputs of the up-sampling processing means; and
 a cyclic prefix insertion means for inserting a cyclic prefix code to output of the IFFT processing means,
 wherein the guard interval extension processing means additionally copies a part of data adjacent to the copied data for extending a guard interval and pastes the part of adjacent data to a previous symbol to reduce interpolation difference between the copied data and original data that are transmitted,
 wherein the interpolation processing means allocates a sub-carrier based on a localized allocation method.

7. A transmitting method for extending a guard interval of data transmitted to terminals which are predicted to have delay extension or a timing error greater than a guard interval in an OFDMA system, comprising the steps of:
 a) generating symbols with a guard interval extended by copying a part of a current symbol and pasting the coped part to a previous symbol;
 b) spreading the symbols with the extended guard interval through Fourier transform;
 c) performing an IFFT process to allocate sub-carriers for the FT processed frequency-domain data based on a localized allocation method; and
 d) inserting a cyclic prefix code to the IFFT processed data,
 wherein in the step a), the symbols with the extended guard interval are generated by additionally copying a part of data adjacent to the copied data for extending the guard interval and pasting the part of adjacent data to a previous symbol in order to reduce difference between the copied data and original data that are transmitted,
 wherein in the step c), a window is used to allocate sub-carriers to reduce tail part of a sub-carrier.

8. A transmitting method for extending a guard interval of data transmitted to terminals which are predicted to have delay extension or a timing error greater than a guard interval in an OFDMA system, comprising the steps of:
 a) generating symbols with a guard interval extended by copying a part of a current symbol and pasting the coped part to a previous symbol;
 b) performing an up-sampling process on the symbols with the extended guard interval;
 c) interpolating the up-sampled symbols by performing circular convolution based on an interpolation filter value to allocate sub-carriers to the up-sampled frequency-domain data; and
 d) inserting a cyclic prefix code to the interpolated data,
 wherein in the step a), the symbols with the extended guard interval are generated by additionally copying a part of data adjacent to copied data for extending the guard interval and pasting the part of adjacent data to a previous symbol in order to reduce difference between the copied data and original data that are transmitted,
wherein in the step c), a window is used to allocate sub-carriers to reduce a tail part of a sub-carrier.

9. The transmitting method of claim 8, wherein in the step c), sub-carriers are allocated based on a localized allocation method.

* * * * *